UNITED STATES PATENT OFFICE.

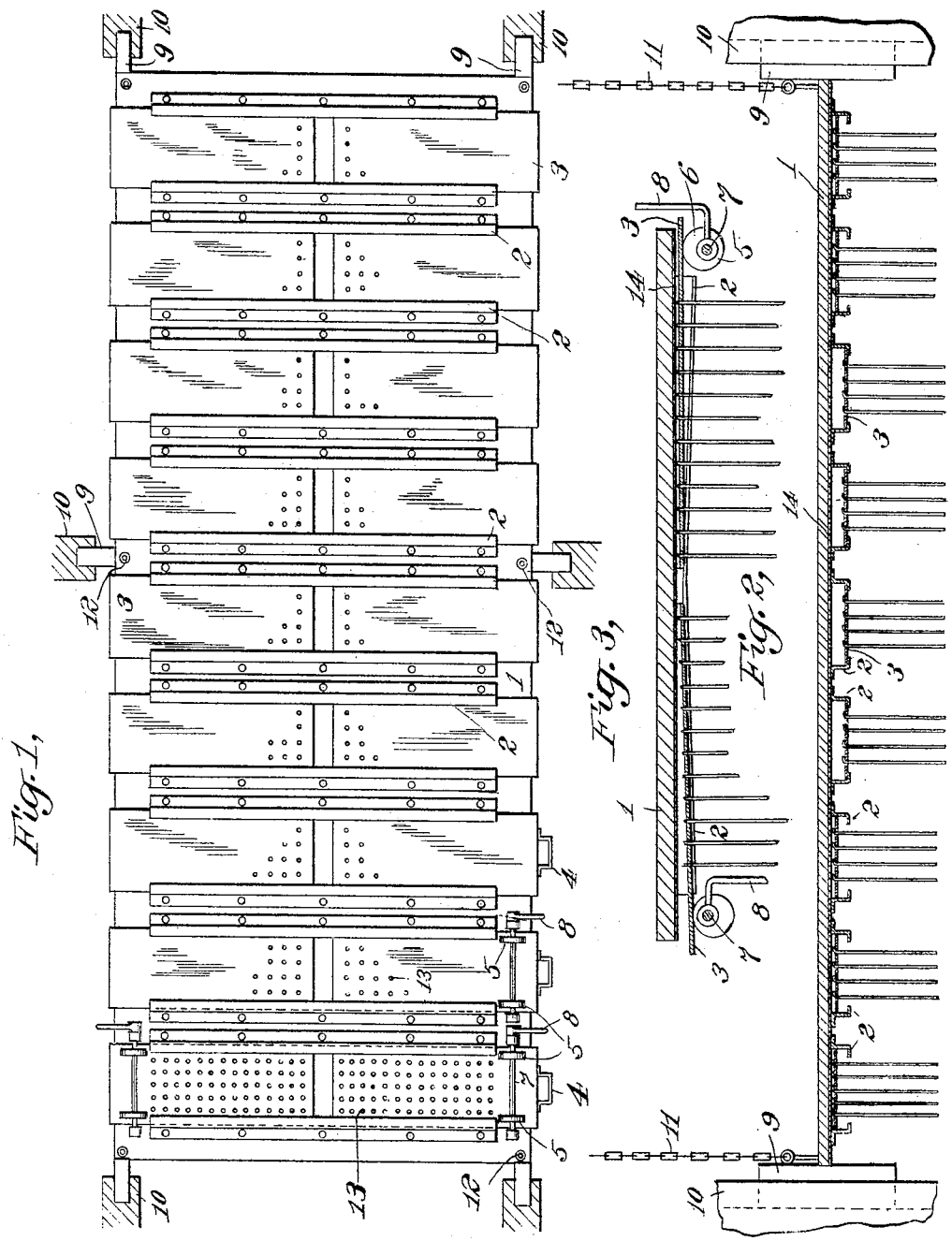

JULIUS PEREIRA, OF NEW YORK, N. Y.

APPARATUS FOR MAKING CANDLES.

No. 803,847.  Specification of Letters Patent.  Patented Nov. 7, 1905.

Application filed May 11, 1905. Serial No. 259,908.

*To all whom it may concern:*

Be it known that I, JULIUS PEREIRA, a citizen of the United States of America, and a resident of the city, county, and State of New York, have invented certain new and useful Improvements in Apparatus for Making Candles, of which the following is a specification, reference being had to the accompanying drawings, forming a part thereof.

My invention relates to improvements in apparatus for making candles, and particularly to improvements in apparatus employed in the manufacture of candles by the dipping process.

My invention consists, essentially, in certain improved means for supporting the wicks, whereby they may be held steadily and firmly during the process of dipping, and whereby they may be easily and quickly adjusted in position and as readily removed when the candle-body is formed around them.

In order that my invention may be fully understood, I will now describe an embodiment thereof, with reference to the accompanying drawings, and will then point out the novel features in claims.

In the drawings, Figure 1 is a bottom view of a clamp-board embodying my invention. Fig. 2 is a view in longitudinal section thereof. Fig. 3 is a view in transverse section of the same on a larger scale.

The device comprises a board or table 1 of any suitable form, shape, size, or configuration. It is here shown as rectangular with plane upper and lower surfaces. Secured to the lower side thereof are a series of guides 2 2, arranged in pairs and adapted to receive and support slides 3. The slides 3, which are arranged in two sets inserted from opposite sides of the board, comprise each a thin perforated plate provided with a handle 4, by which they may be readily manipulated. It may be here remarked that in Fig. 1 of the drawings only that pair of slides at the extreme left-hand side of the figure are completely illustrated in detail with their full complement of perforations, clamping devices, &c., the remaining slides being merely indicated in order to avoid unnecessary duplication. The guides are preferably inclined downwardly toward the outer edge of the table or board, as shown more particularly in Fig. 3, so that they may be readily slid into position without contact with the under side of the table. Once they are in position, as shown at the left-hand side of Fig. 3, they may be raised into intimate engagement with the under side of the table by means of suitable clamping devices 5. The clamping devices herein comprise cams or eccentrics 6, mounted upon shafts 7 and provided with hand-operating levers 8.

On the right-hand side of Fig. 3 one of the slides is shown as pressed upward against the under side of the table clamped in position. I have shown such clamps as at the outer end of the slides—*i. e.*, near the edges of the table; but the clamps may be otherwise disposed, if desired, or a greater or less number of clamps may be employed for each slide, engaging same at different points, or clamps of a different construction may be employed, if preferred.

The table or clamp board 1 is provided with suitable bearing members 9, fitted to the slides 10. A suitable number of these bearing members and slides will be employed to give the necessary stability to the table, so that it will move up and down steadily and evenly. Chains 11 or other connecting means may be secured to the clamp or table at points 12 and may be employed for raising and lowering the table in the manufacture of candles.

In operation the candle-wicks, which are previously dressed, as is common, are mounted in position by having their ends inserted through the perforations 13 in the slides 3, the extreme upper ends of the wick being turned over, as shown more particularly in Fig. 2, the remainder of the wicks being allowed to hang down freely. When all the wicks for a single slide are in position, the slide is pushed into place, supported by its respective guide, and is then clamped in position by means of the clamping device. In so clamping the slide the wick ends which protrude through the perforations will be pressed up against the under side of the table, so that they will be securely held in position during the operation of dipping.

Preferably I provide the under side of the table with a layer of felt, flannel, or similar material 14, so as to provide a yielding surface against which the wick ends will be pressed. As stated above, the slide at the left-hand side in Fig. 3 is shown as merely inserted, but not as clamped in position, while the slide at the right-hand side in said figure is shown as clamped in position. In Fig. 2 four of the slides are shown unclamped and five of them are clamped in position.

When the wicks have all been put in position and clamped in place, the device as a whole is moved vertically up and down, so as to successively submerge the depending wicks into a bath arranged beneath them containing melted paraffin, wax, grease, tallow, or any desired material. After a sufficient number of such dippings a body of this material is formed around the wicks until finally a candle of the desired proportions is produced. When this stage is reached, the clamps may be released and the slides withdrawn from position, the candles being allowed to drop onto a suitable table or other receiver prepared to receive them.

It will be readily understood that I may provide any number of slides for the table and make the table of any desired size, and the capacity of an apparatus of this kind is practically unlimited. In other words, by merely making the apparatus large enough I may make as many candles as I desire in the same time as one may be made. The cost then of manufacturing candles in this manner is reduced to a minimum, and especially is this so when it is considered that a cheap class of labor may be employed, as the work requires practically no skill at all.

What I claim is—

1. In an apparatus of the class described, the combination with a table or board arranged horizontally, and adapted to be vertically reciprocated, of a plurality of movable perforated plates for said table arranged to receive wicks in their perforations, and clamps for clamping the plates against the under face of the table, whereby the ends of the wicks protruding through the perforations, may be clamped between the upper face of the plates and the under face of the table.

2. In an apparatus of the class described, the combination with a table or board arranged horizontally, and adapted to be vertically reciprocated, of a plurality of perforated slides, guides for said slides arranged to receive wicks in their perforations arranged beneath the table, and clamping devices for the slides arranged to clamp them against the under face of the table, whereby the ends of the wicks protruding through the perforations in the slides may be clamped between the upper face of the slides and the under face of the table.

3. In an apparatus of the class described, the combination with a table or board arranged horizontally, and adapted to be vertically reciprocated, of a plurality of perforated slides, guides for said slides arranged to receive wicks in their perforations arranged at an inclination beneath said table, and clamping devices for the slides arranged to clamp them against the under face of the table, whereby the ends of the wicks protruding through the perforations in the slides may be clamped between the upper face of the slides and the under face of the table.

4. In an apparatus of the class described, the combination with a table or board arranged horizontally and adapted to be vertically reciprocated, said table or board provided with a pad of yielding material, of a perforated plate for said table, and means for pressing it against said pad.

5. In an apparatus of the class described, the combination with a table or board arranged horizontally and adapted to be vertically reciprocated, of a perforated plate, and adjustable means for pressing said plate against the under side of the table and clamping it in such position, whereby wick ends protruding through the perforations in said plate will be securely held between the plate and the under side of said table or board.

JULIUS PEREIRA.

Witnesses:
D. HOWARD HAYWOOD,
C. L. HALL.